United States Patent
Zhao et al.

(10) Patent No.: US 11,977,678 B2
(45) Date of Patent: May 7, 2024

(54) ROBOTIC SYSTEM PROVIDING USER SELECTABLE ACTIONS ASSOCIATED WITH GAZE TRACKING

(71) Applicant: INTUITIVE SURGICAL OPERATIONS, INC., Sunnyvale, CA (US)

(72) Inventors: Wenyi Zhao, Weston, FL (US); Christopher J. Hasser, Los Altos, CA (US); Brandon D. Itkowitz, San Jose, CA (US); Paul E. Lilagan, Sunnyvale, CA (US); David D. Scott, Oakland, CA (US); Simon P. DiMaio, San Carlos, CA (US); David W. Robinson, Los Altos, CA (US); Tao Zhao, Sunnyvale, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 0 days.

(21) Appl. No.: 18/311,107

(22) Filed: May 2, 2023

(65) Prior Publication Data

US 2023/0266823 A1 Aug. 24, 2023

Related U.S. Application Data

(63) Continuation of application No. 14/210,840, filed on Mar. 14, 2014, now Pat. No. 11,747,895.

(Continued)

(51) Int. Cl.
*G06F 3/01* (2006.01)
*G06F 3/04815* (2022.01)

(52) U.S. Cl.
CPC .......... *G06F 3/013* (2013.01); *G06F 3/04815* (2013.01)

(58) Field of Classification Search
None
See application file for complete search history.

(56) References Cited

U.S. PATENT DOCUMENTS 3,986,030 A 10/1976 Teltscher
4,081,623 A 3/1978 Vogeley
(Continued)

OTHER PUBLICATIONS

Chin C.A., et al., "Integrated Electromyogram and Eye-Gaze Tracking Cursor Control System for Computer Users with Motor Disabilities," Journal of Rehabilitation Research & Development, 2008, vol. 45 (1), pp. 161-174.

(Continued)

*Primary Examiner* — Haimei Jiang
(74) *Attorney, Agent, or Firm* — Haynes & Boone, LLP.

(57) ABSTRACT

A medical robotic system includes a viewer for displaying an image of a work site, a gaze tracker for tracking a gaze point of a user on the viewer, and a processor. The processor is configured to: draw an area or volume defining shape, overlaid on the image of the work site, in a position determined by the gaze tracker; assign a fixed virtual constraint to the shape and constrain movement of a robotic tool according to the fixed virtual constraint; receive a user selected action command selecting an image of patient anatomy; and superimpose the selected image of the patient anatomy over the image of the work site within the shape. The selected image of the patient anatomy is registered to the image of the work site.

17 Claims, 13 Drawing Sheets

Related U.S. Application Data

(60) Provisional application No. 61/792,939, filed on Mar. 15, 2013.

(56) References Cited

U.S. PATENT DOCUMENTS

| | | | |
|---|---|---|---|
| 5,293,187 A | 3/1994 | Knapp et al. | |
| 6,659,939 B2* | 12/2003 | Moll | A61B 34/35 600/102 |
| 7,035,716 B2* | 4/2006 | Harris | A61B 34/76 600/102 |
| 7,501,995 B2* | 3/2009 | Morita | G06F 3/013 600/300 |
| 7,561,143 B1* | 7/2009 | Milekic | G06F 3/013 345/32 |
| 7,708,407 B2 | 5/2010 | Yang et al. | |
| 7,835,498 B2 | 11/2010 | Bonfiglio et al. | |
| 7,839,423 B2* | 11/2010 | Ishiyama | H04N 7/181 348/240.99 |
| 7,933,508 B2 | 4/2011 | Konicek et al. | |
| 8,073,564 B2* | 12/2011 | Bruemmer | G05D 1/0027 700/245 |
| 8,155,479 B2* | 4/2012 | Hoffman | A61B 34/30 348/240.99 |
| 8,971,597 B2* | 3/2015 | Zhao | A61B 34/30 606/1 |
| 9,185,352 B1* | 11/2015 | Jacques | H04N 7/18 |
| 9,266,239 B2* | 2/2016 | Miller | A61B 90/37 |
| 9,285,874 B2* | 3/2016 | Bychkov | G06F 3/017 |
| 9,307,894 B2 | 4/2016 | Von et al. | |
| 9,492,927 B2* | 11/2016 | Diolaiti | A61B 34/37 |
| 9,503,713 B2 | 11/2016 | Zhao et al. | |
| 9,789,608 B2* | 10/2017 | Itkowitz | A61B 90/361 |
| 10,008,017 B2* | 6/2018 | Itkowitz | A61B 34/37 |
| 10,555,775 B2* | 2/2020 | Hoffman | A61B 1/04 |
| 2002/0105482 A1* | 8/2002 | Lemelson | G06F 3/013 345/32 |
| 2004/0128026 A1* | 7/2004 | Harris | A61B 34/76 700/245 |
| 2005/0204312 A1* | 9/2005 | Rosel | G06F 30/00 715/858 |
| 2005/0206583 A1* | 9/2005 | Lemelson | A61B 3/113 345/7 |
| 2006/0142657 A1* | 6/2006 | Quaid | A61B 90/37 600/424 |
| 2006/0258938 A1* | 11/2006 | Hoffman | A61B 5/06 600/424 |
| 2007/0249967 A1 | 10/2007 | Buly et al. | |
| 2007/0270685 A1* | 11/2007 | Kang | A61B 34/71 600/424 |
| 2008/0004603 A1* | 1/2008 | Larkin | A61B 34/74 606/1 |
| 2009/0036902 A1* | 2/2009 | DiMaio | A61B 8/12 606/130 |
| 2009/0163898 A1* | 6/2009 | Gertner | A61B 3/113 606/4 |
| 2009/0196460 A1* | 8/2009 | Jakobs | G06V 40/19 382/103 |
| 2009/0196480 A1 | 8/2009 | Jakobs et al. | |
| 2009/0248036 A1* | 10/2009 | Hoffman | A61B 1/00149 606/130 |
| 2009/0322041 A1* | 12/2009 | Norton | B25J 15/04 29/428 |
| 2010/0053555 A1* | 3/2010 | Enriquez | G06V 40/19 351/210 |
| 2010/0153076 A1* | 6/2010 | Bellettre | G16H 50/50 703/2 |
| 2010/0165093 A1* | 7/2010 | Sugio | A61B 3/113 348/78 |
| 2010/0174410 A1* | 7/2010 | Greer | A61B 34/37 700/264 |
| 2010/0225209 A1* | 9/2010 | Goldberg | G16H 20/40 312/209 |
| 2010/0295774 A1* | 11/2010 | Hennessey | G06F 3/013 382/103 |
| 2010/0317965 A1 | 12/2010 | Itkowitz et al. | |
| 2010/0318099 A1 | 12/2010 | Itkowitz et al. | |
| 2011/0040305 A1* | 2/2011 | Gomez | A61B 34/74 606/130 |
| 2011/0254865 A1* | 10/2011 | Yee | G06F 3/04886 345/661 |
| 2012/0019645 A1* | 1/2012 | Maltz | G02B 27/017 348/78 |
| 2012/0074296 A1* | 3/2012 | Hammes | G06V 10/141 250/205 |
| 2012/0162603 A1* | 6/2012 | Dejima | A61B 3/113 351/209 |
| 2012/0256967 A1* | 10/2012 | Baldwin | G06F 3/013 345/684 |
| 2012/0290134 A1* | 11/2012 | Zhao | A61B 90/361 901/47 |
| 2013/0042296 A1* | 2/2013 | Hastings | G06Q 50/184 726/1 |
| 2013/0084970 A1* | 4/2013 | Geisner | A63F 13/86 463/31 |
| 2013/0169560 A1* | 7/2013 | Cederlund | G06F 3/014 345/173 |
| 2013/0265227 A1* | 10/2013 | Julian | G06F 3/04812 345/157 |
| 2013/0293488 A1* | 11/2013 | Na | G06F 3/038 345/173 |
| 2013/0303849 A1* | 11/2013 | Allyn | A61B 5/742 600/109 |
| 2013/0321265 A1* | 12/2013 | Bychkov | G06F 3/017 345/156 |
| 2014/0125574 A1* | 5/2014 | Scavezze | G06F 21/34 345/156 |
| 2014/0181106 A1* | 6/2014 | Horowitz | G06F 16/5866 707/737 |
| 2014/0282196 A1 | 9/2014 | Zhao et al. | |
| 2016/0011724 A1* | 1/2016 | Wheeler | G06F 3/013 715/810 |
| 2016/0179336 A1* | 6/2016 | Ambrus | G02B 27/017 715/768 |

OTHER PUBLICATIONS

Duchowski, Andrew T., "A Breadth-First Survey of Eye Tracking Applications," Behavioral Research Methods, Instruments and Computers, Nov. 2002, vol. 34, Issue4, pp. 455-470.

Hutchinson, Thomas E et al., "Human-Computer Interaction Using Eye-Gaze Input," IEEE Transactions on Systems, Man, and Cybernetics, vol. 19, No. 6. Nov./Dec. 1989, pp. 1527-1534.

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

\* cited by examiner

ROBOTIC SYSTEM PROVIDING USER SELECTABLE ACTIONS ASSOCIATED WITH GAZE TRACKING

CROSS-REFERENCE TO RELATED APPLICATIONS

This patent application is a continuation of U.S. patent application Ser. No. 14/210,840 filed Mar. 14, 2014, which claims priority to and the benefit of the filing date of U.S. Provisional Patent Application No. 61/792,939, entitled "ROBOTIC SYSTEM PROVIDING USER SELECTABLE ACTIONS ASSOCIATED WITH GAZE TRACKING," filed Mar. 15, 2013, both of which are hereby incorporated by reference in their entirety.

FIELD OF THE INVENTION

The present invention generally relates to robotic systems and in particular, to a robotic system, and a method implemented therein, for providing user selectable actions associated with gaze tracking.

BACKGROUND OF THE INVENTION

In a robotic system, a plurality of tools may be telerobotically operated by a user to perform a procedure on one or more objects at a work site. An image capture device may be disposed at the work site to capture images of working ends of the tools as they interact with the one or more objects to perform the procedure. This allows the user to view movement of the working ends on a display while telerobotically controlling the tools using associated input devices.

Since the user has a limited number of hands and feet to interact with input devices, it may be necessary to selectively associate and disassociate a larger number of tools with a lesser number of input devices so that only a limited number of the tools may be telerobotically operated by the user at a given time. To supplement the limited number of associated tools, other human-machine interfaces may be employed to control disassociated tools and/or perform other user selectable actions.

The use of eye movement or gaze tracking as an additional user input mechanism has been proposed for performing pre-programmed actions. For example, U.S. Pat. No. 3,986,030 describes an eye-motion operable keyboard for paraplegics or other incapacitated persons. U.S. Pat. No. 4,081,623 describes the use of eye blinking to dial a telephone or control a piece of machinery. U.S. Pat. No. 5,293,187 describes the use of eye movement to control computers or machinery. U.S. Pat. No. 7,501,995 describes the use of gaze tracking to retrieve and display information relevant to a user's current gaze location. U.S. Pat. No. 7,835,498 describes switching a function of a medical device on and off using gaze detection. U.S. Pat. No. 7,933,508 describes a user-friendly camera interface which displays menus on a view finder of the camera which can be manipulated by a user's voice and gaze.

Thus, there are many ways gaze tracking may be used as a human-machine interface. Rather than using only one pre-programmed action, however, it is desirable to use gaze tracking with a number of user selectable actions in a robotic system. To facilitate such use of gaze tracking, a framework for performing user selectable actions using gaze tracking is desirable.

Whereas eye tracking implies that only movement of the eyes is tracked, gaze tracking implies that movement of the user's gaze on an object, such as a computer display screen, is being tracked. Thus, gaze tracking conventionally involves eye tracking with assumptions regarding corresponding gaze locations on the object. Such assumptions may be based upon calibration data wherein eye tracking data is correlated with known or user identified gaze locations on the object. Such calibration data, however, may only be valid for a specific user. Further, even for a specific user, occasional recalibration may be desirable. Thus, user specific calibration and periodic recalibration are desirable.

OBJECTS AND SUMMARY OF THE INVENTION

Accordingly, one object of one or more aspects of the present invention is a robotic system, and method implemented therein, that provides user selectable actions associated with gaze tracking.

Another object of one or more aspects of the present invention is a robotic system, and method implemented therein, that provides one or more novel user selectable actions using gaze tracking.

Another object of one or more aspects of the present invention is a robotic system, and method implemented therein, that provides a framework for providing user selectable actions using gaze tracking.

Another object of one or more aspects of the present invention is a robotic system, and method implemented therein, that provides a calibration of a user's gaze tracking.

Still another object of one or more aspects of the present invention is a robotic, and method implemented therein, that provides a recalibration of a user's gaze tracking during the performance of a user selected action using gaze tracking.

These and additional objects are accomplished by the various aspects of the present invention, wherein briefly stated, one aspect is a robotic system comprising: a viewer; a gaze tracker for tracking a gaze point of a user on the viewer; and a processor programmed to perform a plurality of user selectable actions associated with the gaze point.

Another aspect is a method for performing a plurality of user selectable actions associated with gaze tracking, the method comprising: determining a gaze point of a user on a viewer by using gaze point calibration data; providing an indication of the determined gaze point on the viewer; and performing a user selected action associated with the gaze point upon receiving an indication from the user that the determined gaze point does not require adjustment.

Additional objects, features and advantages of the various aspects of the present invention will become apparent from the following description of its preferred embodiment, which description should be taken in conjunction with the accompanying drawings.

DETAILED DESCRIPTION

Although a medical robotic system is initially described herein to provide context for the present invention in terms of one specific example, it is to be appreciated that the various aspects of the invention are not to be limited to medical robotic systems. They are applicable to robotic systems in general.

Figure 1:
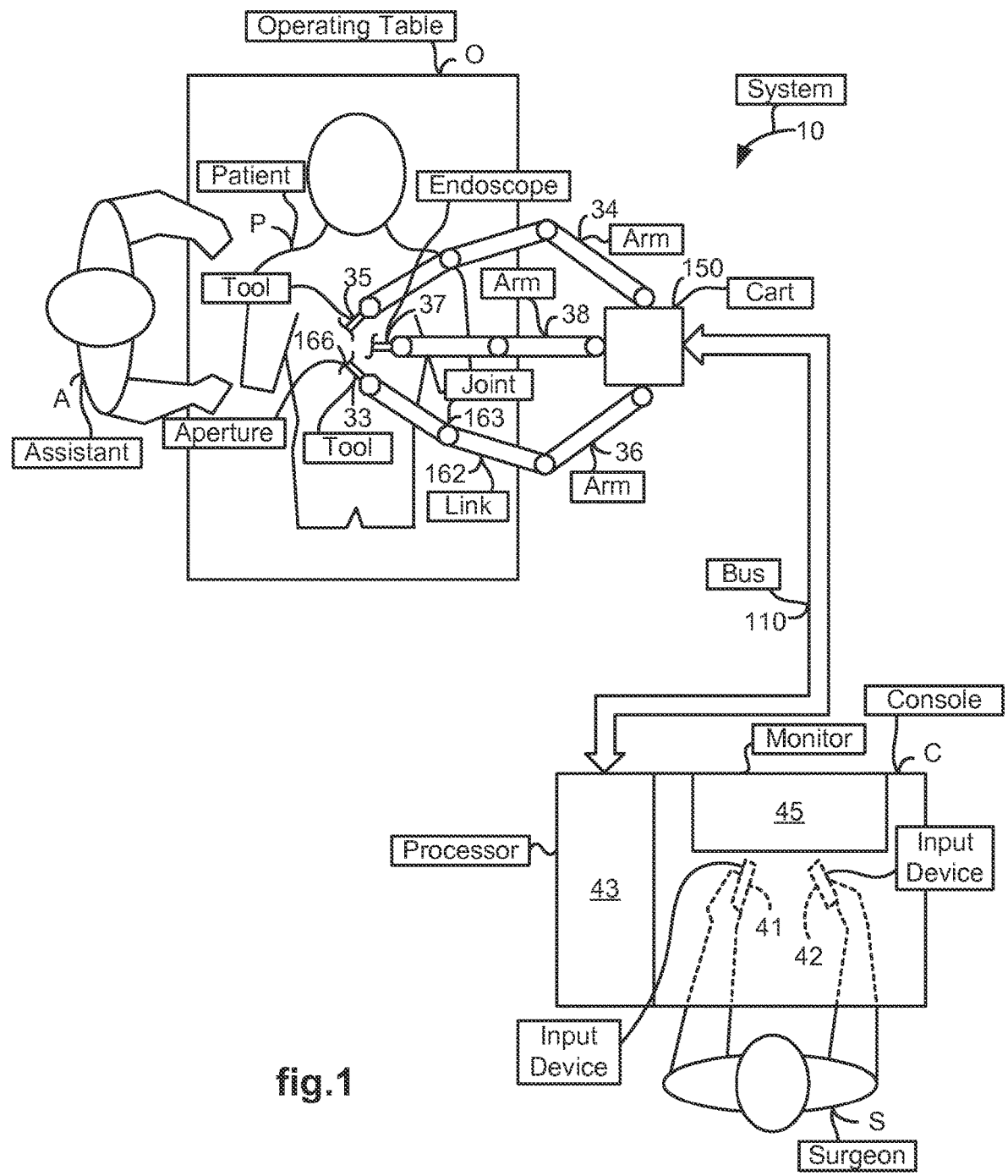
FIG. 1 illustrates a top view of a work site employing a robotic system utilizing aspects of the present invention.

FIG. 1 illustrates a top view of an operating room in which a medical robotic system 10 is being employed by a Surgeon ("S") to perform a medical procedure on a Patient ("P"). The medical robotic system in this case is a Minimally Invasive Robotic Surgical (MIRS) system including a Console ("C") utilized by the Surgeon while performing a minimally invasive diagnostic or surgical procedure on the Patient with assistance from one or more Assistants ("A") while the Patient is on an Operating table ("O").

Figure 4:
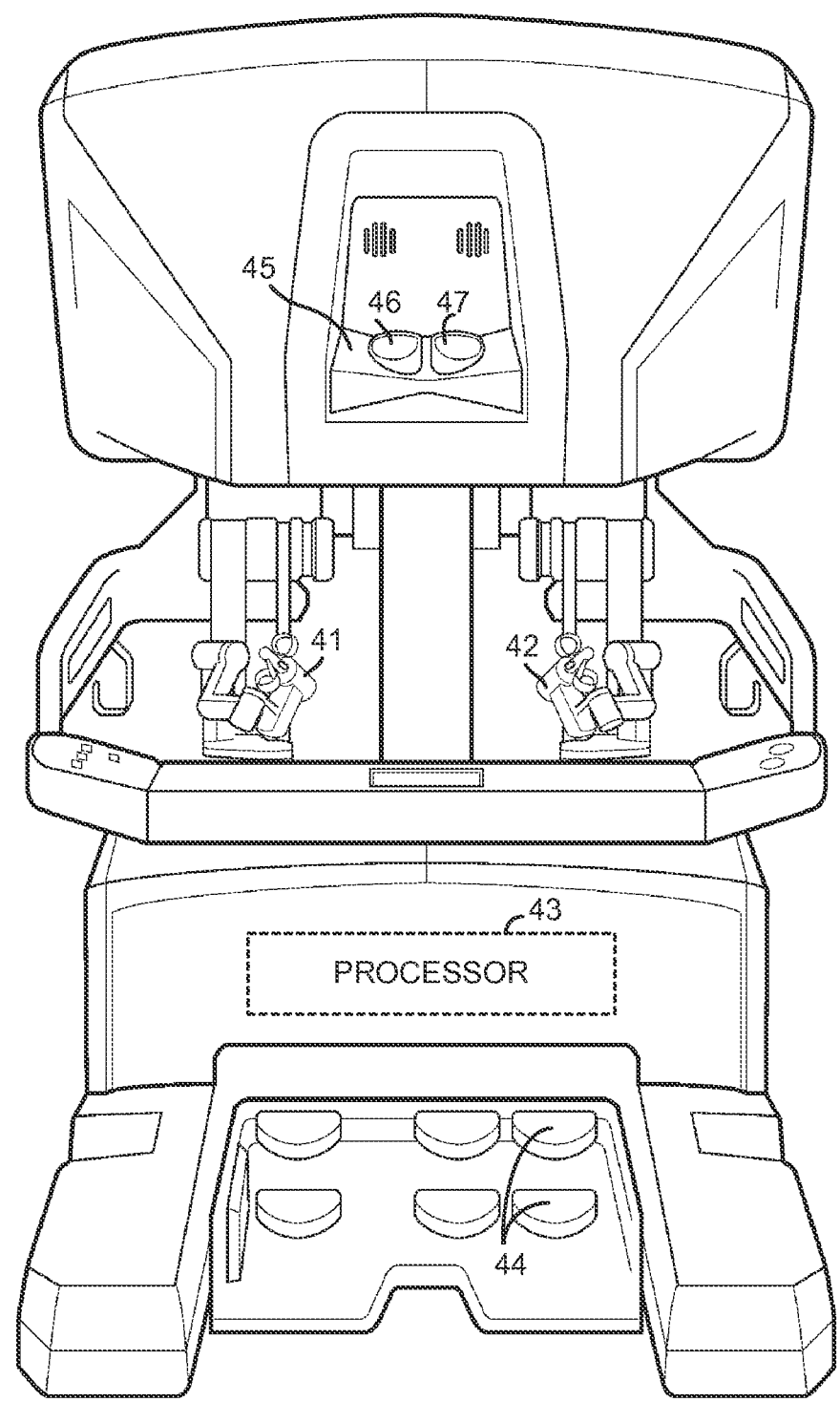
FIG. 4 illustrates a front view of a console usable in a robotic system utilizing aspects of the present invention.

The Console, as further described in reference to FIG. 4, includes a processor 43 which communicates with a movable cart 150 over a bus 110. A plurality of robotic arms 34, 36, 38 are included on the cart 150. A tool 33 is held and manipulated by robotic arm 36, another tool 35 is held and manipulated by robotic arm 34, and an endoscope 37 is held and manipulated by robotic arm 38. In this example, each of the tools 33, 35 and the endoscope 37 is introduced through its own entry aperture in the Patient. As an example, tool 33 is inserted into aperture 166 to enter the Patient.

The Surgeon performs the medical procedure by manipulating the input devices 41, 42 so that the processor 43 causes their respectively associated robotic arms 34, 36 to manipulate their respective removably coupled tools 33, 35 accordingly while the Surgeon views real-time images of a work site in three-dimensions ("3D") on a stereo vision display 45 of the Console. A stereoscopic endoscope 37 (having left and right cameras for capturing left and right stereo views) captures stereo images of the work site. The processor 43 processes the stereo images so that they may be properly displayed on the stereo vision display 45.

Each of the robotic arms 34, 36, 38 is conventionally formed of links, such as link 162, which are coupled together and manipulated through actuatable joints, such as joint 163. Each of the robotic arms includes a setup arm and a slave manipulator. The setup arm positions its held tool so that a pivot point occurs at its entry aperture into the Patient. The slave manipulator may then manipulate its held tool or endoscope so that it may be pivoted about the pivot point, inserted into and retracted out of the entry aperture, and rotated about its shaft axis. The robotic arms 34, 36, 38 may be carted into the operating room via the cart 150 or alternatively, they may be attached to sliders on a wall or ceiling of the operating room.

Figure 2:
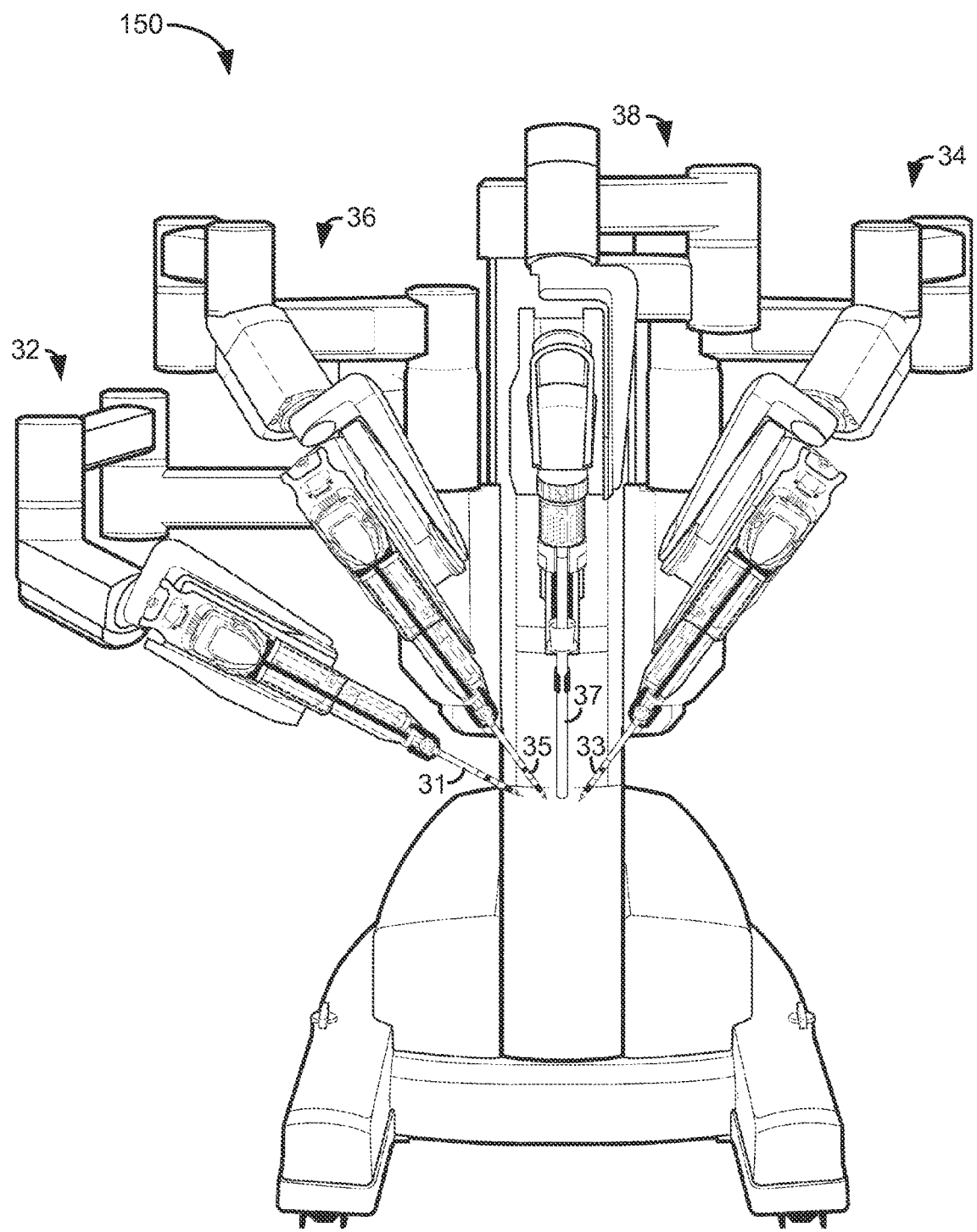
FIG. 2 illustrates a front view of a movable cart usable in a robotic system utilizing aspects of the present invention.

FIG. 2 illustrates a front view of the cart 150. In addition to the robotic arms 34, 36, 38, shown in FIG. 1, a fourth robotic arm 32 is shown in FIG. 2. The fourth robotic arm 32 is available so that another tool 31 may be introduced at the work site along with the tools 33, 35 and endoscope 37.

Figure 3:
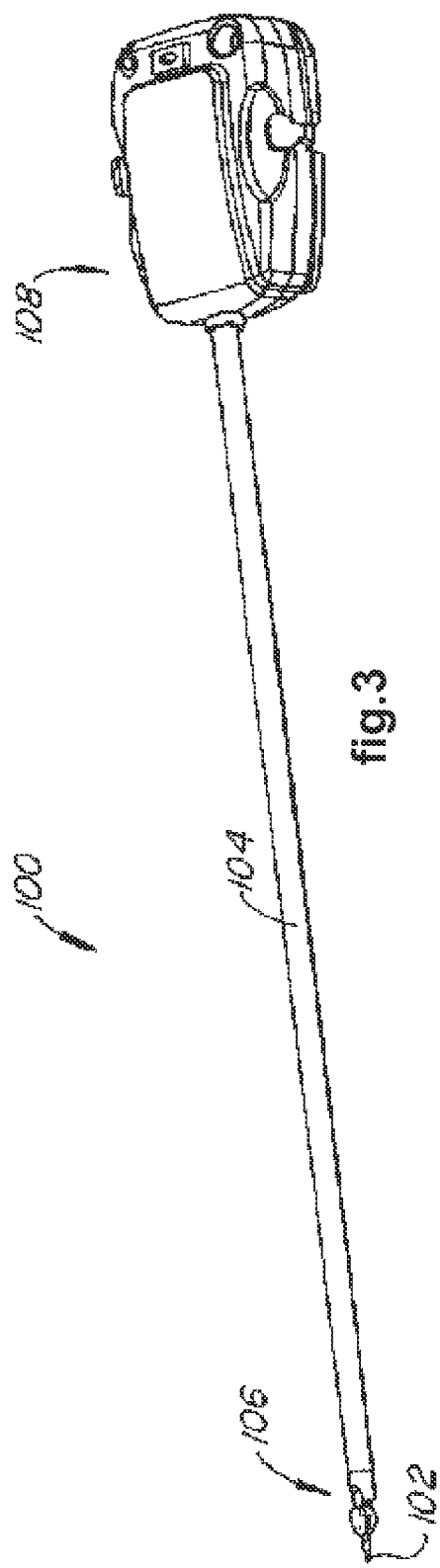
FIG. 3 illustrates a perspective view of a tool usable in a robotic system utilizing aspects of the present invention.

FIG. 3 illustrates an exemplary tool 100 that may be used for either tool 33 or 35. The tool 100 comprises an interface housing 108, a shaft 104, an end effector 102, and a wrist mechanism 106 which includes one or more wrist joints. The interface housing 108 is removably attached to a robotic arm so as to be mechanically coupled to actuators (such as motors) in the slave manipulator of the attached robotic arm. Cables or rods, that are coupled to the actuators of the slave manipulator and extend through the shaft 104 from the interface housing 108 to the one or more wrist joints of the wrist mechanism 106 and to the jaws of the tool's end effector 102, actuate the wrist joints and jaws in a conventional manner. The slave manipulator may also manipulate the tool in pitch and yaw angular rotations about its pivot point at the entry aperture, manipulate the tool in a roll angular rotation about the tool's shaft axis, and insert and retract the tool along a rail on the robotic arm as commanded by the processor 43.

FIG. 4 illustrates, as an example, a front view of the Console usable in the medical robotic system 10. The Console has left and right input devices 41, 42 which the user may grasp respectively with his/her left and right hands to manipulate associated devices, such as the tools 33, 35, in preferably six degrees-of-freedom ("DOF"). Foot pedals 44 with toe and heel controls are provided on the Console so the user may control movement and/or actuation of devices associated with the foot pedals. A processor 43 is provided in the Console for control and other purposes. The stereo vision display 45 is provided so that the user may view the work site in stereo vision from images captured by the stereoscopic camera of the endoscope 37. Left and right eyepieces, 46 and 47, are provided in the stereo vision display 45 so that the user may view left and right two-dimensional ("2D") display screens inside the display 45 respectively with the user's left and right eyes.

The processor 43 performs various functions in the medical robotic system. One important function that it performs is to translate and transfer the mechanical motion of input devices 41, 42 through control signals over bus 110 to command actuators of their associated robotic arms to actuate their respective joints so that the Surgeon can effectively manipulate devices, such as the tools 33, 35, and endoscope 37. Another function is to perform various methods described herein. Although described as a processor, it is to be appreciated that the processor 43 may be implemented by any combination of hardware, software and firmware. Also, its functions as described herein may be performed by one unit or divided up among different components, each of which may be implemented in turn by any combination of hardware, software and firmware. Further, although being shown as part of or being physically adjacent to the Console, the processor 43 may also comprise a number of subunits distributed throughout the system.

U.S. Pat. No. 6,659,939 B2 entitled "Cooperative Minimally Invasive Telesurgical System," which is incorporated herein by reference, provides additional details on a medical robotic system such as described herein.

Figure 5:
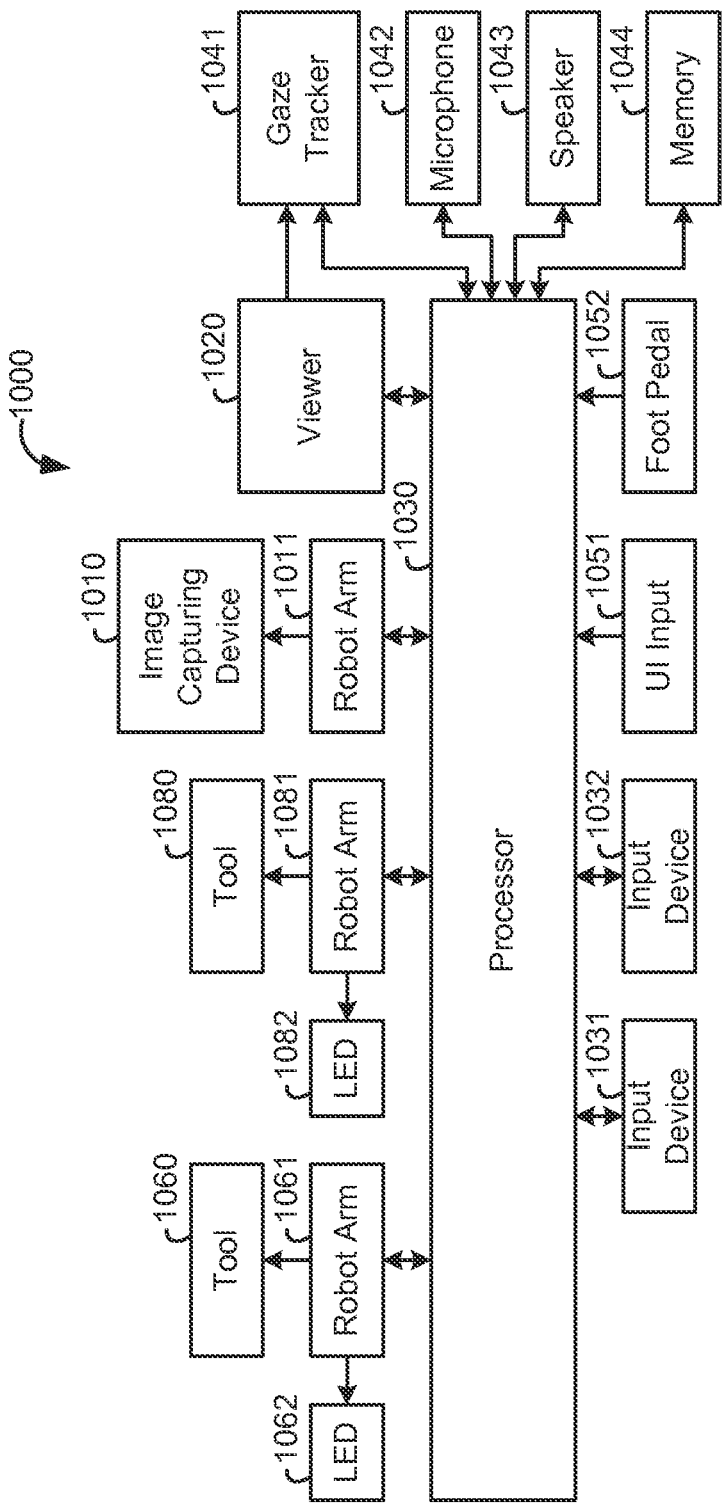
FIG. 5 illustrates a block diagram of a robotic system utilizing aspects of the present invention.

FIG. 5 illustrates, as an example, a block diagram of a general robotic system 1000. An image capture device 1010 is preferably a high-definition digital stereo camera that generates a video stream of stereo images captured at a frame rate of the camera, such as thirty frames per second. Each frame of stereo images includes a left stereo image and a right stereo image. In use, the image capture device 1010 is typically disposed at a work site to capture images of one or more objects at the work site.

A processor 1030 is programmed to process images received from the image capture device 1010 and cause the processed images to be displayed on a viewer 1020. The viewer 1020 is preferably a stereo viewer having left and right display screens for respectively displaying left and right stereo images derived from the left and right stereo images captured by the image capture device 1010.

Input devices 1031, 1032, a User Interface (UI) input 1051, a foot pedal 1052, a microphone 1042, a speaker 1043, and a gaze tracker 1041 are provided to facilitate user interaction with the robotic system 1000. The input devices 1031, 1032 (also referred to as "masters") may be any conventional computer input device such as a joystick, computer mouse, keyboard, microphone, or digital pen and pad. The UI input 1051 may be disposed on or adjacent to one of the input devices 1031, 1032 or the foot pedal 1052 so that it may be within easy reach of a user's hands or feet to be used as a conventional switch to turn operational modes ON and OFF or as a conventional selection device. The microphone 1042 facilitates user input to a voice recognition function performed by the processor 103 and the speaker 1043 facilitates system auditory warnings or action prompts which may be issued to the user.

The gaze tracker 1041 is provided for tracking a user's gaze on the viewer 1020. Preferably, the gaze tracker 1041 is a stereo gaze tracking system. An example of such a gaze tracking system is describe in U.S. Application No. 61/554,741 entitled "Method and System for Stereo Gaze Tracking", which is incorporated herein by reference. If the viewer 1020 only has a single two-dimensional display screen, however, any conventional gaze tracker may be usable with a video-based system preferred since it is non-contacting.

Although shown as a separate component in FIG. 5, the gaze tracker 1041 preferably includes eye tracking hardware in the viewer 1020 that communicates information of such eye tracking to the processor 1030 which processes the information to determine a gaze point of the user on a display screen of the viewer 1020. For example, the viewer may include one or more light sources such as one or more infrared Light Emitting Diodes (IR LEDs) for directing light onto an eye of the user, a reflected light or image capturing device such as a Charge Coupled Device (CCD) camera, and one or more mirrors such as Dichroic mirrors for directing the reflected light from and/or image of the eye of the user to the reflected light or image capturing device. Information of the reflected light or captured image of the right eye is then transmitted from the reflected light or image capturing device to the processor 1030 so that the information may be analyzed using known techniques to determine the gaze and gaze point of the user's eye on the viewer 1020.

Tools 1060, 1080 are provided so that they may interact with objects at a work site. The tools 1060, 1080, and the image capture device 1010 are robotically manipulatable by their robotic arms 1061, 1081, and 1011 (also referred to as "slaves"), which are controlled by the processor 1030 in response to user interaction with associated ones of the input devices 1031, 1032 and foot pedal 1052. Although only two tools and a limited number of input devices are shown in the figure, it is to be appreciated that more or less tools and input devices may be employed in the robotic system 1000, depending upon what is needed at the time for interacting with objects in a work site.

The processor 1030 performs various functions in the robotic system 1000, including those performed by the processor 43 of the medical robotic system 10. As previously mentioned, it controls robotic operation of the tools 1060, 1080, and the image capture device 1010 in response to user interaction with associated input devices, such as the input devices 1031, 1032 and the foot pedal 1052. Also, the processor 1030 may process images captured by the image capture device 1010 for display on the viewer 1020. The processor 1030 also may be used to perform various methods and controllers described herein. Although described as a processor, it is to be appreciated that the processor 1030 may be implemented by any combination of hardware, software, and firmware. Also, its functions as described herein may be performed by one unit or divided up among different components, each of which may be implemented in turn by any combination of hardware, software, and firmware. In performing its various tasks, the processor 1030 executes program code which is non-transitorily stored in memory 1044.

Figure 6:
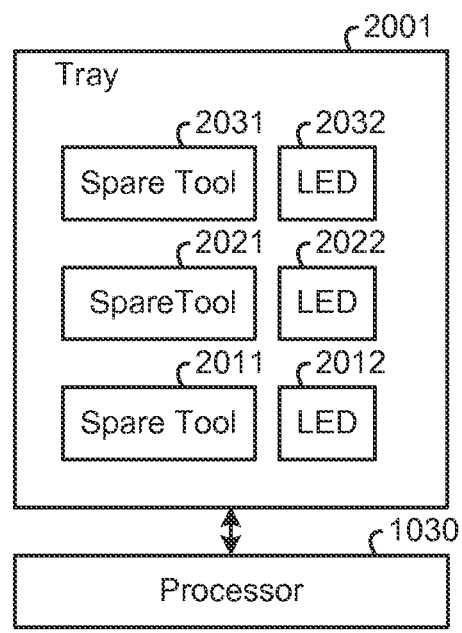
FIG. 6 illustrates a block diagram of a spare tool subsystem usable in a robotic system utilizing aspects of the present invention.

FIG. 6 illustrates, as an example, a block diagram of a spare tool subsystem which is usable as an accessory to, or as part of, the robotic system 1000. The spare tool subsystem comprises a tray 2001 (or other storage receptacle) and a plurality of spare tools, such as spare tools 2011, 2021, 2031. Each of the spare tools may be mounted on one of the robotic arms 1061, 1081 to replace its currently mounted tool. A Light Emitting Diode (LED) (or other visual indicator), such as LEDs 2012, 2022, 2032, is disposed proximate to each of the spare tools and coupled to the processor 1030. Thus, a user may activate one of the LEDs using an appropriate input device coupled to the processor 1030 or through one of the methods described herein.

Figure 7:
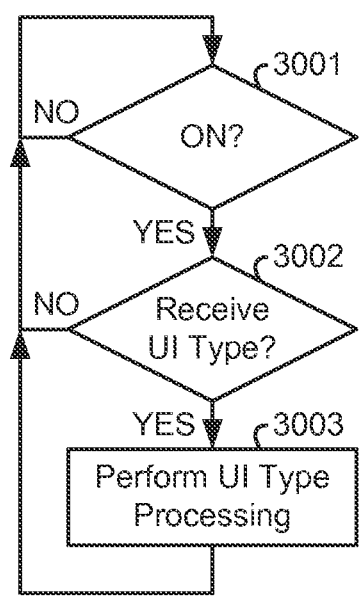
FIG. 7 illustrates a flow diagram of a method for performing a plurality of user selectable actions associated with gaze tracking as usable in a robotic system utilizing aspects of the present invention.

FIG. 7 illustrates, as an example, a flow diagram of a method, which is implemented by the processor 1030, for performing a plurality of user selectable actions associated with gaze tracking in the robotic system 1000. In block 3001, the method determines whether or not a Gaze Tracking User Interface operating mode is currently turned ON. If the determination in block 3001 is NO, then the method continuously loops through block 3001 until a YES determination is made, the user halts the method, or the system halts the method. Conventional ways in which the system may halt the method include a power-off, a system reset or restart, and a timed-out condition. On the other hand, if the determination in block 3001 is YES, then the proceeds to block 3002.

In block 3002, the method determines whether an indication of a User Interface (UI) type has been received from the user. Examples of a UI type include an object, a box, a cursor, and a calibration function. If the determination in block 3002 is NO, then the method continuously loops through blocks 3001-3002 until a YES determination is made in block 3002, the user halts the method, or the system halts the method. On the other hand, if the determination in block 3002 is YES, then the proceeds to block 3003. In block 3003, the method performs a user specified action associated with the user's gaze point for the indicated UI type. Examples of such UI type processing are described in reference to FIGS. 8-17. After completing the action, the method returns to block 3001.

Figure 8:
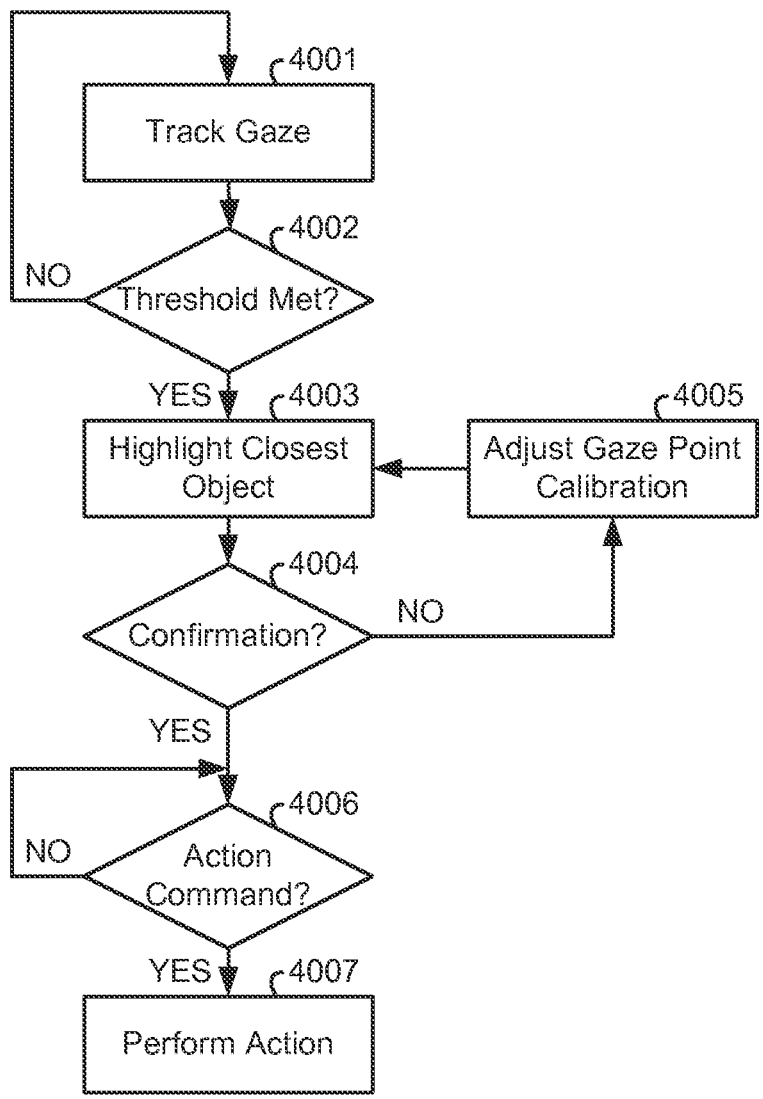
FIG. 8 illustrates a flow diagram of a method for performing a plurality of user selectable actions associated with gaze tracking for a first user interface type as usable in a robotic system utilizing aspects of the present invention.

FIG. 8 illustrates, as an example, a flow diagram of a method, which is implemented by the processor 1030, for performing a plurality of user selectable actions associated with gaze tracking in the robotic system 1000 when the UI type is an object.

In block 4001, the method processes information received from eye tracking hardware in the viewer 1020 to track a user's gaze on a display screen of the viewer 1020, as previously explained with respect to the gaze tracker 1041.

In block 4002, the method determines whether the user's gaze point has been fixated on a point or within a specified distance to the point for a threshold period of time. The specified distance and threshold period are preferably determined beforehand empirically to ensure that the user intends an action to be taken relative to an object that the user's gaze point is on at the time. Alternatively, the threshold period may be effectively eliminated by the user activating the UI input 1051 or the foot pedal 1052 to indicate that the user intends an action to be taken relative to an object that the user's gaze point is on at the time. If the determination in block 4002 is NO, then the method continuously loops through blocks 4001-4002 until a YES determination is made, the user halts the method, or the system halts the method. On the other hand, if the determination in block 4002 is YES, then the method proceeds to block 4003.

In block 4003, the method identifies and highlights an image of an object on the viewer 1020 that is closest to the user's gaze point at the time. The object in this case may be a physical object located at the work site, such as an object to be worked on or a tool to work on the object. An example of an object to be worked on is an anatomical structure of a patient for a medical robotic system. Alternatively, the object may be an artificial object being displayed by the processor 1030 on the viewer 1020, such as an icon or text.

If the user's gaze point is on an image of a robotically manipulated tool at the work site, then identification of the tool is readily performed by, for example, using conventional tool tracking techniques and a previously determined transform which maps points in each tool's reference frame to a viewer reference frame. Additional details for tool tracking may be found, for example, in U.S. 2006/0258938 A1 entitled "Methods and System for Performing 3-D Tool Tracking by Fusion of Sensor and/or Camera Derived Data During Minimally Invasive Robotic Surgery," which is incorporated herein by reference. Additional details for reference frame transforms may be found, for example, in U.S. 2012/0290134 A1 entitled "Estimation of a Position and Orientation of a Frame Used in Controlling Movement of a Tool," which is incorporated herein by reference.

If the user's gaze point is on an image of an object to be worked on at a work site, such as an anatomical structure of a patient, the object may be identified in a number of different ways. As an example, the user may identify the object and communicate such identification to the method using any one of the user input mechanisms provided, such as a Graphical User Interface (GUI) or a Voice Recognition System. As another example, the method may identify the object using previously identified objects in an earlier captured image that is spatially registered with the currently displayed image on the viewer 1020. As still another example, the method may first extract blobs from an image of the work site that is being displayed at the time on the viewer 1020. If the gaze point is within one of the extracted blobs, then that blob is compared against information of physical object templates stored in the memory 1044. If the gaze is not within one of the extracted blobs, then a closest blob is compared against information of physical object templates stored in the memory 1044. For stereovision viewers, it is to be appreciated that the extracted blobs are three-dimensional. For monovision viewers, the extracted blobs are generally two-dimensional.

If the user's gaze point is on an artificial object being displayed by the processor 1030 on the viewer 1020, identification of the artificial object is a straightforward process of defining a pixel area on the viewer 1020 corresponding to the artificial object and checking to see if the user's gaze point on the viewer 1020 falls within the pixel area. If it does, then the method has identified the artificial object. For stereovision viewers, it is to be appreciated that the pixel areas are three-dimensional volumes. For monovision viewers, the pixel areas are generally two-dimensional.

Once the object is identified, the object is highlighted in some fashion on the viewer 1020. As an example, a cross may be displayed on, or a box displayed around, an image of a physical object. As another example, the color or brightness of the displayed image of artificial object may be altered. As another example, the displayed image of the artificial object may blink on and off. The method then proceeds to block 4004.

In block 4004, the method determines whether a confirmation of the object is received from the user. The confirmation may be received in the form of user activation of the UI input 1051, user interaction with one of the input devices 1031, 1032, or a voice command which indicates that the object being highlighted in block 4003 is the object that the user is gazing at. As an example, the user confirmation may be received through the microphone 1042, converted to digital information, and processed by voice recognition software executed by the processor 1030. In this case, confirmation may take the form of a voice command "YES" and a denial may take the form of a voice command "NO". Preferably, however, the denial will take the form of a voice command indicating a correctional direction to be taken. As an example, for a stereovision viewer, such voice commands may comprise "UP", "DOWN", "RIGHT", "LEFT", "FORWARD", and "BACK". For a monovision viewer, the voice commands may be limited to just "UP", "DOWN", "RIGHT", and "LEFT". As another example, user interaction with the UI input 1051 may provide "YES" and "NO" indications, such as one click indicating a "YES" and two clicks indicating a "NO". As still another example, user interaction with one of the input devices 1031, 1032 may provide the correctional directions.

If the determination in block 4004 is NO (i.e., recalibration is to be initiated), then the method proceeds to block 4005. In block 4005, the method performs processing to adjust the gaze point calibration after receiving a correctional direction to be taken from the user. Preferably, the correctional direction is already received in block 4004. If not previously provided, then the method will prompt the user to provide a correctional direction. In this case, the closest object in the correctional direction relative to the currently highlighted object is selected and the gaze point recalibrated to that object. The method then jumps back to block 4003 to highlight the newly selected object.

On the other hand, if the determination in block 4004 is YES (i.e., recalibration is not necessary at this time), then the method proceeds to block 4006. In block 4006, the method determines whether an action command has been received from the user. There are a number of ways the user may specify the action command to the system. As an example, the user may speak the action command into the microphone 1042 so that it may be processed through voice recognition software by the processor 1030. As another example, the user may interact with system 1000 using one of the input devices 1031, 1032 to select the action command from a menu of action commands displayed at the time on the viewer 1020. As yet another example, the user may simply type in the action command using one of the input devices 1031, 1032. If the determination in block 4006 is NO, then the method continuously loops through block 4006 until a YES determination is made, the user halts the method, or the system halts the method. When block 4006 results in a YES determination, then method proceeds to block 4007 where it performs the user selected action.

Table 1 lists examples of user selectable action commands and corresponding actions taken when the object is a tool and the user's gaze point is on an image of one of tools being displayed on the viewer 1020. Note that some of the actions taken result in selectable icons or text being displayed. In these cases, the user may repeat the method of FIG. 8 to select one of the selectable icons or text.

TABLE 1

| Gaze Point | Action Command | Action Taken |
| --- | --- | --- |
| Tool | MENU | Display menu of Action Commands as selectable Text. |
| Tool | IDENTIFY TOOL | Display tool identification. |
| Tool | IDENTIFY MASTER | Display identification of associated master. |
| Tool | STATUS | Display remaining life information and any usage warnings. |
| Tool | SWAP TOOL | Display selectable Icons of spare tools. |
| Tool | SWAP MASTER | Display selectable Icons of masters; highlight currently associated master. |
| Tool | FOLLOW | Place image capture device in "camera following" mode and |

TABLE 1-continued

| Gaze Point | Action Command | Action Taken |
| --- | --- | --- |
| | | display text indicating such on the viewer. |

Figure 12:
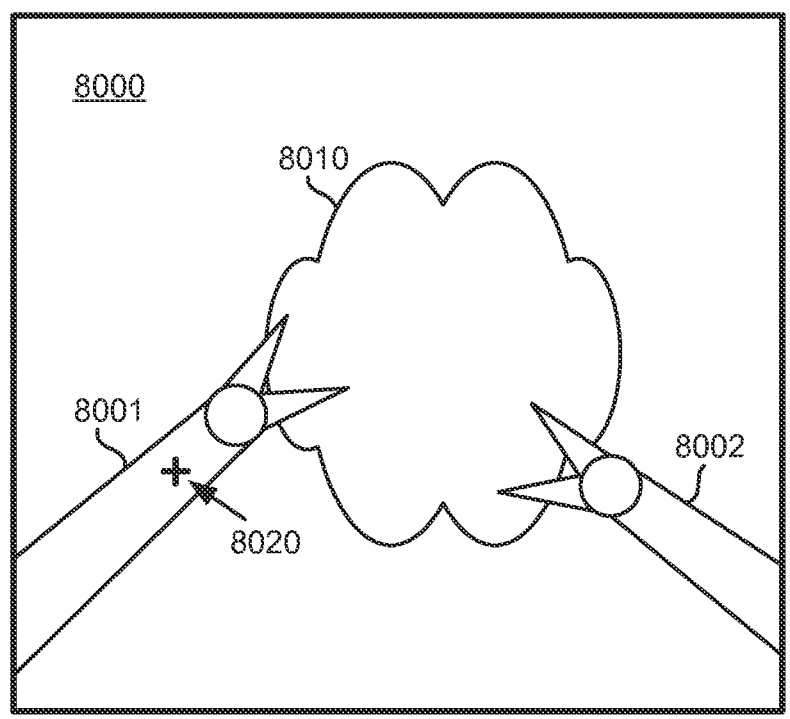
FIG. 12 illustrates a front view of a viewer, as usable in a robotic system utilizing aspects of the present invention, with an indicated user gaze point on a tool.
Figure 15:
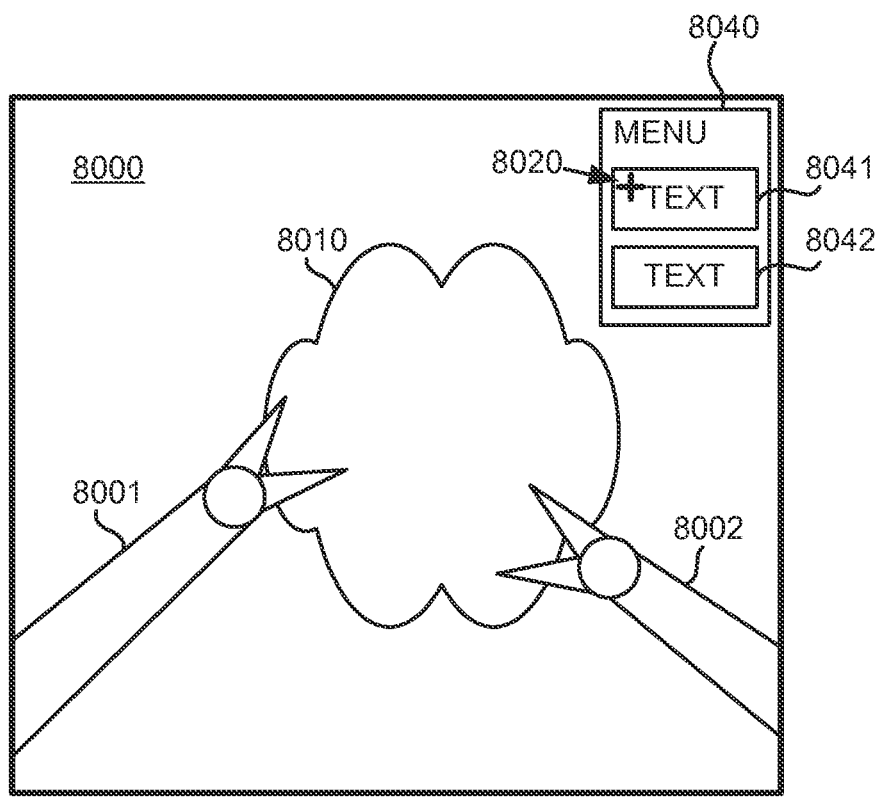
FIG. 15 illustrates a front view of a viewer, as usable in a robotic system utilizing aspects of the present invention, with a displayed menu of options and an indicated user gaze point on one of the options.

In particular, when the user's gaze point is on a tool, such as shown in FIG. 12 where the determined user's gaze point is indicated by cross 8020 on an image of one of the tools 8001, 8002 on the display screen 8000 of the viewer 1010, a user selected action command of "MENU" results in the displaying of a menu of Action Commands as selectable Text on the viewer 1010, such as shown in FIG. 15 where the menu 8040 with selectable Text 8041, 8042 is displayed on the display screen 8000 of the viewer 1010. In this case, the user may select the selectable Text 8041 by using the method of FIG. 8 or by using one of the input devices 1031, 1032 serving as a conventional computer mouse. The menu of action commands is useful for users who either do not know or cannot remember all available action commands for the UI type.

Alternatively, a user selected action command of "IDENTIFY TOOL" results in tool identification information being displayed on or adjacent an image of the tool on the viewer 1010. Alternatively, a user selected action command of "IDENTIFY MASTER" results in identification information for the master which is currently associated with the tool to be displayed on or adjacent an image of the tool on the viewer 1010. The associated master in this case is the input device which controls robotic movement of the tool. Alternatively, a user selected action command of "STATUS" results in status information for the tool being displayed on or adjacent an image of the tool on the viewer 1010. The status information may include the remaining life of the tool in terms of hours, number of usages, or other maintenance and/or replacement measures. It may also include warnings if the usage reaches certain thresholds or certain conditions are met.

Alternatively, a user selected action command of "SWAP TOOL" results in designating the gazed upon tool as one that should be replaced. At the same time, selectable icons of spare tools are displayed on the viewer, such as shown for only a single selectable icon in FIG. 14 where a selectable icon 8030 is displayed on the display screen 8000 of the viewer 1010. In this case, the user may select the selectable icon 8030 by using the method of FIG. 8 or by using one of the input devices 1031, 1032 serving as a conventional computer mouse. Alternatively, a user selected action command of "SWAP MASTER" results in selectable icons of masters being displayed on the viewer. In this case, the selectable icon of the master which is currently associated with the tool is highlighted in some fashion. By selecting the selectable icon of another master, the currently associated master would be disassociated from the tool and the master corresponding to the selected one of the selectable icons would be associated to the tool. The icon of the newly associated master would then be highlighted and user interaction with the newly associated master would now control movement of the tool.

Alternatively, a user selected action command of "FOLLOW" results in placing the image capture device 1010 into a coupled control mode referred to as "camera following" in which the image capture device 1010 is automatically moved so that the working end of the tool remains in approximately the center of its Field of View (FOV). At the same time, text or a graphic indicating that the image capture device 1010 is in "camera following" mode may be displayed on or adjacent an image of the tool on the display screen 8000 of the viewer 1010. Additional details on such a coupled control mode may be found, for example, in U.S. 2010/0274087 entitled "Medical Robotic System with Coupled Control Modes," which is incorporated herein by reference.

In addition to the listed examples of user selectable action commands in Table 1, it is to be appreciated that the application in which the robotic system 1000 is being used may result in other user selectable action commands being defined and performed by the method of FIG. 8.

Table 2 lists examples of user selectable action commands and corresponding actions taken when the object is an anatomical structure and the user's gaze point is on an image of the anatomical structure which is being displayed on the viewer 1020. Note that some of the actions taken result in selectable icons or text being displayed. In these cases, the user may repeat the method of FIG. 8 to select one of the selectable icons or text.

Alternatively, a user selected action command of "INSTRUCTIONS" results in previously prepared instructions or notes about the procedure to be performed on the anatomical structure to be displayed on the viewer 1010. The instructions and notes in this case may have been prepared by the surgeon performing the procedure using the robotic system 1000 or by an expert surgeon providing such guidance and/or advice. Alternatively, a user selected action command of "IDENTIFY" results in text being displayed on the viewer 1010 which identifies the anatomical structure by name. In addition to its identification, certain information about the anatomical structure may also be provided on the viewer 1010.

Alternatively, a user selected action command of "START MEASUREMENT" results in starting a distance measurement using the current gaze point on the anatomical structure as being a starting point. A subsequent user selected action command of "STOP MEASUREMENT" results in ending the distance measurement using the gaze point at that time on the anatomical structure as being the ending point.

TABLE 2

| Gaze Point | Action Command | Action Taken |
| --- | --- | --- |
| Anatomical Structure | MENU | Display menu of Action Commands as selectable Text. |
| Anatomical Structure | INSTRUCTIONS | Display text of procedure instructions or notes. |
| Anatomical Structure | IDENTIFY | Display text with identification of anatomical structure. |
| Anatomical Structure | START MEASUREMENT | Combine with gaze tracking as 3-D mouse to indicate starting point for distance measurement. |
| Anatomical Structure | STOP MEASUREMENT | Combine with gaze tracking as 3-D mouse to indicate ending point for distance measurement; Display measurement as text. |
| Anatomical Structure | GENERATE IMAGE | Display selectable Icons of available Imaging Modalities. |
| Anatomical Structure | REGISTERED IMAGE | Display selectable Icons of available images. When selected, display selected image as registered overlay to current image. |
| Anatomical Structure | WINDOWED IMAGE | Display selectable Icons of available images. When selected display selected image in separate window. |

Figure 13:
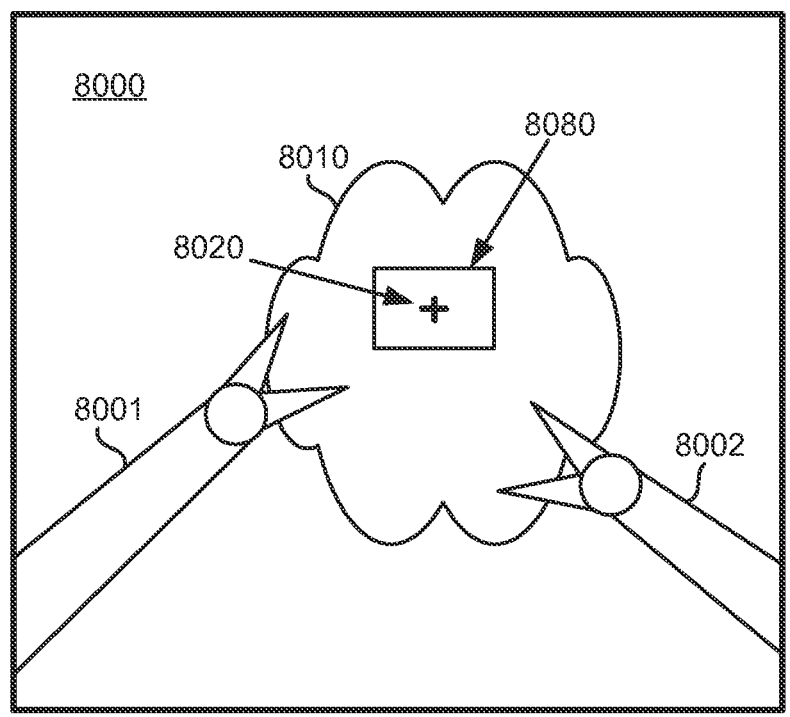
FIG. 13 illustrates a front view of a viewer, as usable in a robotic system utilizing aspects of the present invention, with an indicated user gaze point on a physical object at a work site.
Figure 14:
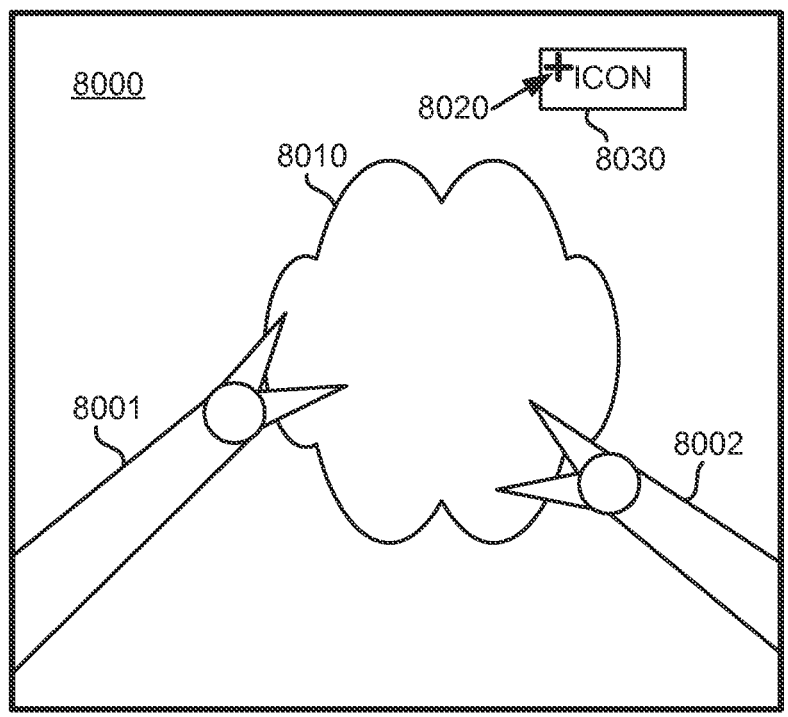
FIG. 14 illustrates a front view of a viewer, as usable in a robotic system utilizing aspects of the present invention, with a displayed icon and an indicated user gaze point on the displayed icon.

In particular, when the user's gaze point is on an anatomical structure, such as shown in FIG. 13 where the determined user's gaze point is indicated by cross 8020 on an image of the anatomical structure 8010 on the display screen 8000 of the viewer 1010, a user selected action command of "MENU" results in the displaying of a menu of Action Commands as selectable Text on the viewer 1010, such as shown in FIG. 15. In this case, the user may select the selectable Text 8041 by using the method of FIG. 8 or by using one of the input devices 1031, 1032 serving as a conventional computer mouse. The menu of action commands is useful for users who either do not know or cannot remember all available action commands for the UI type.

The distance between the starting and ending points is then determined and displayed as text on the viewer 1010.

Alternatively, a user selected action command of "GENERATE IMAGE" results in displaying selectable Icons of available intraoperative Imaging Modalities on the display screen of the viewer 1010. As an example, besides the imaging modality used by the image capture device 1010, other imaging modalities may be available to capture images of the work site, such as ultrasound, X-ray fluoroscopy, Computed Tomography (CT), and Magnetic Resonance Imaging (MRI). In this case, the user may select one of the selectable Icons by using the method of FIG. 8 or by using one of the input devices 1031, 1032 serving as a conventional computer mouse. An instruction may then be sent to an Assistant operating the selected imaging modality to generate an image of the anatomical structure using the selected imaging modality.

Alternatively, a user selected action command of "REGISTERED IMAGE" results in displaying selectable Icons of available intraoperative and preoperative images on the display screen of the viewer 1010. In this case, the user may select one of the selectable Icons by using the method of FIG. 8 or by using one of the input devices 1031, 1032 serving as a conventional computer mouse. Upon selecting one of the selectable Icons, the corresponding image is registered and displayed as an overlay to the image of the anatomical structure on the viewer 1010. Alternatively, a user selected action command of "WINDOWED IMAGE" also results in displaying selectable Icons of available intraoperative and preoperative images on the display screen of the viewer 1010. In this case, the user may select one of the selectable Icons by using the method of FIG. 8 or by using one of the input devices 1031, 1032 serving as a conventional computer mouse. Upon selecting one of the selectable Icons, the corresponding image is displayed in a separate window than that of the image of the anatomical structure on the viewer 1010, such as a picture-in-picture arrangement.

In addition to the listed examples of user selectable action commands in Table 2, it is to be appreciated that the application in which the robotic system 1000 is being used may result in other user selectable action commands being defined and performed by the method of FIG. 8.

Table 3 lists examples of user selectable action commands and corresponding actions taken when the object is an icon and the user's gaze point is on an icon which is being displayed on the viewer 1020. Note that these icons are usually displayed as a result of action commands taken while processing tool and anatomical structure objects as previously described in reference to Tables 1 and 2.

TABLE 3

| Gaze Point | Action Command | Action Taken |
| --- | --- | --- |
| Icon of Spare Tool | SELECT | Activate LED of selected spare tool. |
| Icon of Master | ASSOCIATE | Tool disassociated from current master and associated with selected master. |
| Icon of Available Imaging Modality | SELECT | Send instruction to assistant to generate image using selected imaging modality. |
| Icon of Image to be Registered | DISPLAY | Display selected image as registered overlay to currently displayed image. |
| Icon of Image to be Windowed | DISPLAY | Display selected image in separate window. |

In particular, when the user's gaze point is on an icon of an available spare tool, a user selected action command of "SELECT" results in selecting the spare tool corresponding to the icon as a tool to replace a currently mounted tool that was previously designated for replacement in a counterpart action to the present action. In this case, an LED associated with the spare tool is activated so that an Assistant knows which tool is to be mounted on a robotic arm as a replacement tool. An example of such spare tool LED activation was previously described in reference to FIG. 6.

Alternatively, when the user's gaze point is on an icon of a swappable master, a user selected action command of "ASSOCIATE" results in disassociating a master currently associated with a tool that was previously designated in a counterpart action to the present action and associating the master corresponding to the selected icon to the tool. The selected icon of the swappable master is then highlighted to indicate that it is now associated with the tool.

Alternatively, when the user's gaze point is on an icon of an available intraoperative imaging modality, a user selected action command of "SELECT" results in sending an instruction to an Assistant operating the selected imaging modality to generate an image of one or more objects at the work site using the selected imaging modality.

Alternatively, when the user's gaze point is on an icon of a selectable icon of an image to be registered, a user selected action command of "DISPLAY" results in displaying the corresponding image as a registered overlay to a currently displayed image on the viewer 1010. Alternatively, when the user's gaze point is on an icon of a selectable icon of an image to be windowed, a user selected action command of "DISPLAY" results in displaying the image corresponding to the icon in a separate window, such as a picture-in-picture. In both cases, images corresponding to the icons have been previously captured and stored for subsequent retrieval in the memory 1044.

In addition to the listed examples of user selectable action commands in Table 3, it is to be appreciated that the application in which the robotic system 1000 is being used may result in other user selectable action commands being defined and performed by the method of FIG. 8.

Table 4 lists an example of a user selectable action command and corresponding action taken when the object is text and the user's gaze point is on text which is being displayed on the viewer 1020. Note that the text being displayed in this case is a result of an action command taken while processing tool and anatomical structure objects previously described in reference to Tables 1 and 2. In particular, when the user's gaze point is on text in a menu of selectable actions, a user selected action command of "SELECT" results in executing the action corresponding to the text. Although only selectable text in a displayed menu is described herein, it is to be appreciated that the application in which the robotic system 1000 is being used may result in other user selectable action commands being defined and performed by the method of FIG. 8.

TABLE 4

| Gaze Point | Action Command | Action Taken |
| --- | --- | --- |
| Text in Menu | Select | Execute Action Command corresponding to text. |

Figure 9:
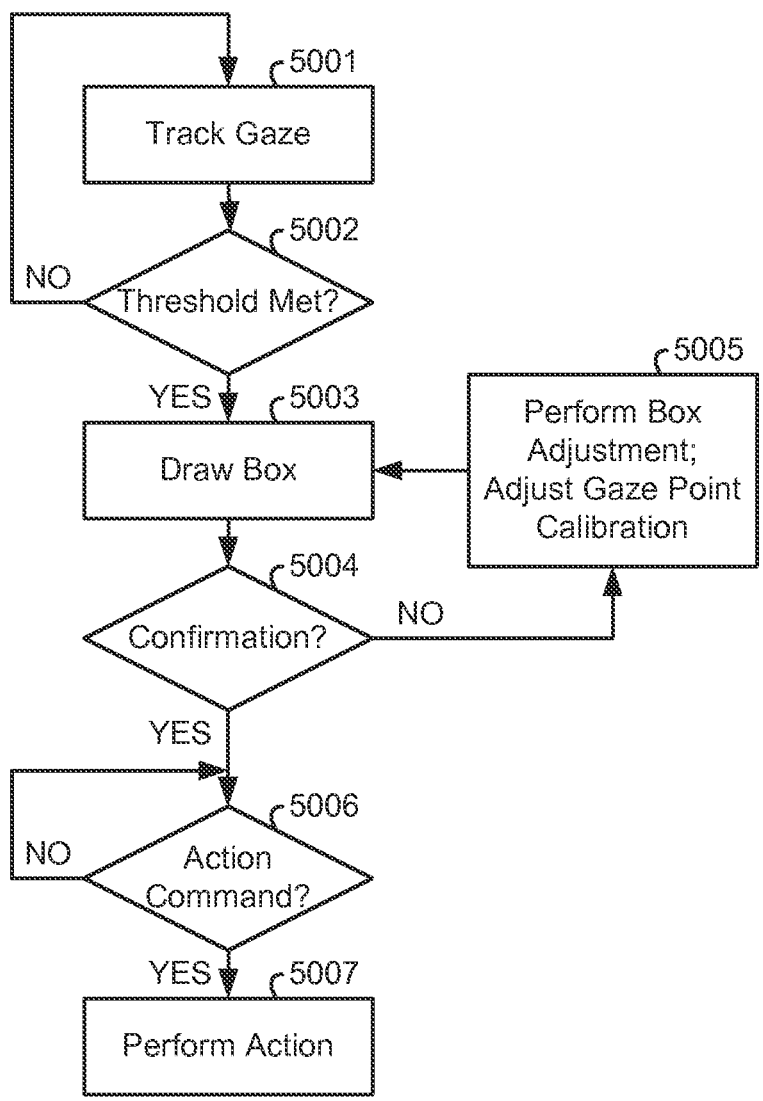
FIG. 9 illustrates a flow diagram of a method for performing a plurality of user selectable actions associated with gaze tracking for a second user interface type as usable in a robotic system utilizing aspects of the present invention.

FIG. 9 illustrates, as an example, a flow diagram of a method, which is implemented by the processor 1030, for performing a plurality of user selectable actions associated with gaze tracking in the robotic system 1000 when the UI type is a box. Although a box is described herein, it is to be appreciated that any type of area or volume defining shape may be used. Such shapes may be pre-programmed or user defined in any one or more of a number of conventional ways.

In block 5001, the method processes information received from eye tracking hardware in the viewer 1020 to track a user's gaze on a display screen of the viewer 1020, as previously explained with respect to the gaze tracker 1041.

In block 5002, the method determines whether the user's gaze point has been fixated on a point or within a specified distance to the point for a threshold period of time. The specified distance and threshold period are preferably determined beforehand empirically to ensure that the user intends an action to be taken relative to an object that the user's gaze point is on at the time. Alternatively, the threshold period may be effectively eliminated by the user activating the UI input 1051 or the foot pedal 1052 to indicate that the user intends an action to be taken relative to an object that the user's gaze point is on at the time. If the determination in block 5002 is NO, then the method continuously loops through blocks 5001-5002 until a YES determination is made, the user halts the method, or the system halts the method. When block 5002 results in a YES determination, the method proceeds to block 5003.

In block 5003, the method draws a box around the user's gaze point on the viewer 1020, wherein the box is positioned on the display 1020 so that the gaze point is in its center. The size of the box may be a default size or it may be user specified during a set-up procedure, such as at the start of the method.

In block 5004, the method determines whether a confirmation of the box is received from the user. The confirmation may be received in the form of user activation of the UI input 1051, user interaction with one of the input devices 1031, 1032, or a voice command which indicates that the box drawn in block 5003 is of the desired size and location on the viewer 1020. As an example, when a voice command is used, the user confirmation may be received through the microphone 1042, converted to digital information in a conventional manner, and processed by voice recognition software executed by the processor 1030. In this case, confirmation may take the form of a voice command "YES" and a denial may take the form of a voice command "NO". Preferably, however, the denial will take the form of a voice command indicating a correctional action to be taken. The correctional action may be a correctional direction to be taken, such as "UP", "DOWN", "RIGHT", "LEFT", "FORWARD", and "BACK" in three-dimensional space. The correctional action may be a correctional sizing, such as "INCREASE WIDTH", "DECREASE WIDTH", "INCREASE LENGTH", "DECREASE LENGTH", "INCREASE DEPTH", and "DECREASE DEPTH" for a three-dimensional box. Alternatively, user interaction with the UI input 1051 may provide "YES" and "NO" indications, such as one click indicating a "YES" and two clicks indicating a "NO". Also, user interaction with one of the input devices 1031, 1032, alone or as part of a Graphical User Interface (GUI), may provide the correctional directions and/or sizing.

If the determination in block 5004 is NO, then the method proceeds to block 5005. In block 5005, the method performs processing to adjust the box location and/or the sizing according to correctional directions and/or sizing received in making the determination in block 5004. Note that since the gaze point is to be centered in the box, if the box location is changed by the user, then this also results in recalibrating the user's gaze point. The method then jumps back to block 5003 and draws the box on the viewer 1010 using the adjusted location and/or sizing.

On the other hand, if the determination in block 5004 is YES, then the method proceeds to block 5006. In block 5006, the method determines whether an action command has been received from the user. If the determination in block 5006 is NO, then the method continuously loops through block 5006 until a YES determination is made, the user halts the method, or the system halts the method. On the other hand, if the determination in block 5006 is YES, then method proceeds to block 5007 where it performs the user selected action. There are a number of ways the user may specify the action command to the system. As an example, the user may speak the action command into the microphone 1042 so that it may be processed through voice recognition software by the processor 1030. As another example, the user may interact with system 1000 using one of the input devices 1031, 1032 to select the action command from a menu of action commands displayed at the time on the viewer 1020. As yet another example, the user may simply type in the action command using one of the input devices 1031, 1032.

Table 5 lists examples of user selectable action commands and corresponding actions taken when the UI type is a box centered around the user's gaze point on the viewer 1020.

TABLE 5

| Gaze Point | Action Command | Action Taken |
| --- | --- | --- |
| Box | ADJUST FOCUS | Automatically focus camera as function of camera to work site object distance. |
| Box | ZOOM-IN/ZOOM-OUT (specified percentage) | Zoom-In/Zoom-Out a default percentage or specified percentage. |
| Box | ADJUST BRIGHTNESS | Automatically adjust brightness of camera as function of camera to working object distance. |
| Box | INCREASE/DECREASE RESOLUTION (specified percentage) | Increase/decrease resolution of captured image. |
| Box | CONSTRAIN TOOLS | Constrain working ends of tools to only move within the Box. |

In particular, after a box has been displayed around a user's determined gaze point on the viewer 1020, a user selected action command of "ADJUST FOCUS" results in performing an automatic focus function on the image capture device 1010 as a function of a distance from the image capturing end of the image capture device 1010 to an object whose image is being viewed at the time inside the displayed box on the viewer 1020. Alternatively, a user selected action command of "ZOOM-IN" or "ZOOM-OUT" results in performing a zoom-in or zoom-out function on the image capture device 1010 for either a default or user specified percentage of range. Alternatively, a user selected action command of "ADJUST BRIGHTNESS" results in performing an automatic brightness adjustment function on the image capture device 1010 as a function of a distance from the image capturing end of the image capture device 1010 to an object whose image is being viewed at the time inside the displayed box on the viewer 1020. Alternatively, a user selected action command of "INCREASE RESOLUTION" or "DECREASE RESOLUTION" results in performing a resolution adjustment function on the image captured by the image capture device 1010. In particular, the resolution of the captured image may be increased by a default percentage or user specified percentage by interpolating between captured image pixels for increased resolution, such as performing such interpolation after every two pixels in two or three dimensions, respectively for two-dimensional and three-dimensional images. Conversely, the resolution of the captured image may be decreased by a default percentage or user specified percentage by skipping pixels for decreased resolution, such as skipping every third pixel in two or three dimensions. Note that all of these actions are taken on the entire image so the box only serves as a symbolic indication of the type of action that may be taken.

Other user selected action commands may be defined that actually make use of the location and size of the box. As an example, a user selected action command of "CONSTRAIN TOOLS" results in establishing a virtual constraint in which the processor 1030 acting as a controller for robotically manipulating the tools 1060, 1080 responds to such user selected action command by constraining commanded movement of the working ends of those tools to only move within an area/volume of the work site corresponding to the area/volume of the box defined on the viewer 1020 in blocks 5003-5005 of FIG. 5. Alternatively, such constraint may be to prohibit the tools from entering an area/volume of the work site corresponding to the area/volume of the box. As other examples, certain image characteristics in a region of interest defined by the box may be adjusted, images of objects within the box may be zoomed-in or zoomed-out, and the image within the box may be displayed on an auxiliary viewer that is being viewed at the time by an assistant.

In addition to the listed examples of user selectable action commands in Table 5, it is to be appreciated that the application in which the robotic system 1000 is being used may result in other user selectable action commands being defined and performed by the method of FIG. 9.

Figure 10:
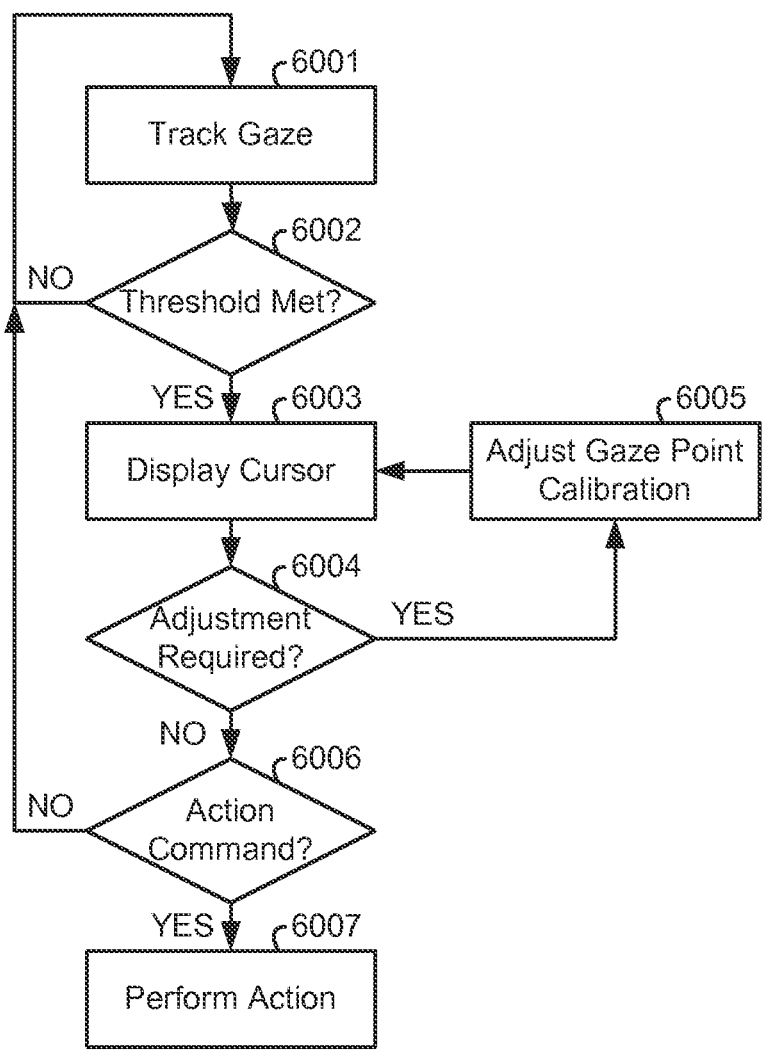
FIG. 10 illustrates a flow diagram of a method for performing a plurality of user selectable actions associated with gaze tracking for a third user interface type as usable in a robotic system utilizing aspects of the present invention.

FIG. 10 illustrates, as an example, a flow diagram of a method, which is implemented by the processor 1030, for performing a plurality of user selectable actions associated with gaze tracking in the robotic system 1000 when the UI type is a cursor.

In block 6001, the method processes information received from eye tracking hardware in the viewer 1020 to track a user's gaze on a display screen of the viewer 1020, as previously explained with respect to the gaze tracker 1041.

In block 6002, the method determines whether the user's gaze point has been fixated on a point or within a specified distance to the point for a threshold period of time. The specified distance and threshold period are preferably determined beforehand empirically to ensure that the user intends an action to be taken relative to an object that the user's gaze point is on at the time. Alternatively, the threshold period may be effectively eliminated by the user activating the UI input 1051 or the foot pedal 1052 to indicate that the user intends an action to be taken relative to an object that the user's gaze point is on at the time. If the determination in block 6002 is NO, then the method continuously loops through blocks 6001-6002 until a YES determination is made, the user halts the method, or the system halts the method. When block 6002 results in a YES determination, the method proceeds to block 6003.

In block 6003, the method draws a cursor at the user's gaze point on the viewer 1020. The cursor may be of any prespecified or user specified shape, such as those commonly used for a mouse cursor, except that its movement will be controlled by the user's gaze point on the viewer 1020 instead of by a computer mouse.

In block 6004, the method determines whether a cursor position adjustment is required by the user. If the user requires an adjustment, the user may communicate such desire to the system by user interaction with the UI input 1051, one of the input devices 1031, 1032, or a voice command. As an example, when a voice command is used, the user's required cursor position adjustment may be communicated through the microphone 1042, converted to digital information in a conventional manner, and processed by voice recognition software executed by the processor 1030. In this case, the communication may take the form of a voice command indicating a correctional direction to be taken, such as "UP", "DOWN", "RIGHT", "LEFT", "FORWARD", and "BACK" in three-dimensions. In this case, a default number of pixels may be used for the correction or a user specified number of pixels may be used. Alternatively, the communication may take the form of a voice command, such as "CALIBRATE", in which case, the method of FIG. 11 may be initiated. As another example, the user may interact with UI input 1051 or one of the input devices 1031, 1032, alone or as part of a Graphical User Interface (GUI), to specify the correctional direction or initiation of a calibration process.

If the determination in block 6004 is YES, then the method proceeds to block 6005. In block 6005, the method adjusts the gaze point calibration according to either the correctional direction received by the user in block 6004 or by performing the calibration method described in reference to FIG. 11. The method then jumps back to block 6003 and draws the cursor at the adjusted calibration location.

On the other hand, if the determination in block 6004 is NO, then the method proceeds to block 6006. In block 6006, the method determines whether an action command has been received from the user. If the determination in block 6006 is NO, then the method continuously loops through blocks 6001-6006 until a YES determination is made in block 6006, the user halts the method, or the system halts the method. When block 6006 results in a YES determination, method proceeds to block 6007 where it performs the user selected action. In this case, the action may be any action normally associated with a computer mouse since the user's gaze point in this case is being used to move a cursor on the viewer 1020 like a computer mouse may normally do.

Figure 11:
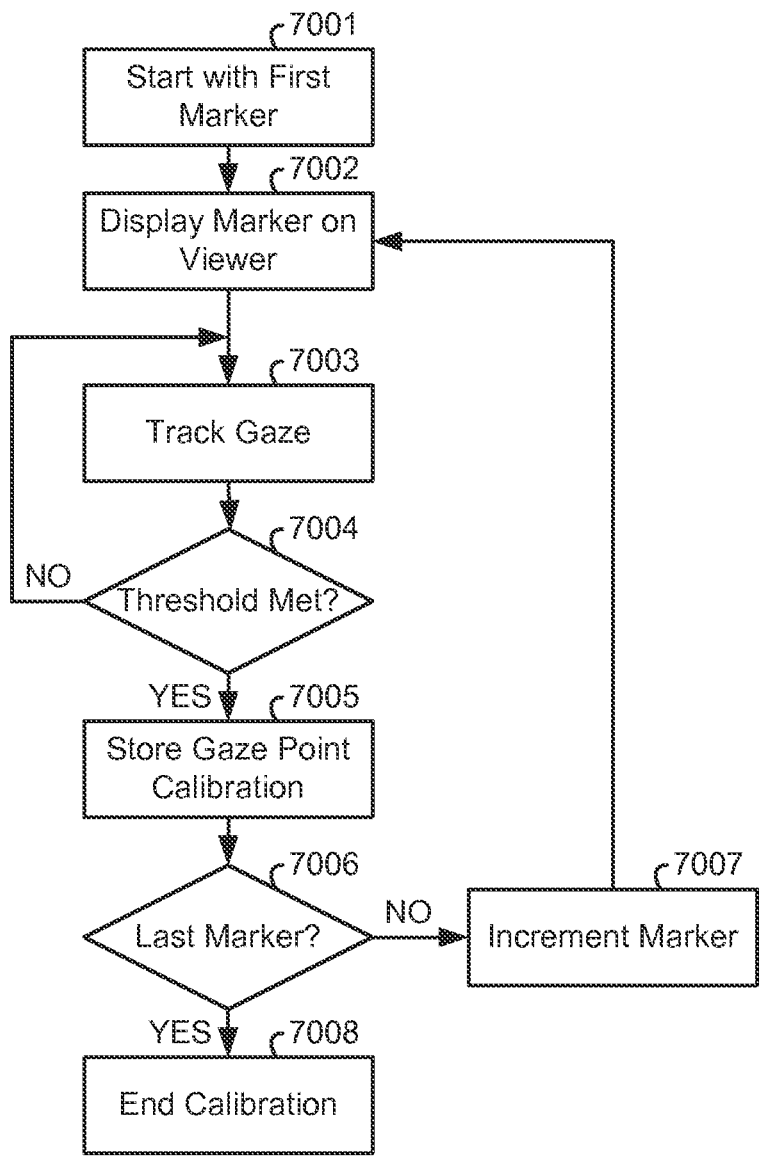
FIG. 11 illustrates a flow diagram of a method for performing a calibration of a user's gaze point as one of a plurality of user selectable actions which are usable in a robotic system utilizing aspects of the present invention.

FIG. 11 illustrates, as an example, a flow diagram of a method, which is implemented by the processor 1030, when the UI type is calibration.

In block 7001, the method identifies a first marker to be displayed on the viewer 1020. The first marker in this case is the first in a sequence of markers corresponding to an array of displayable markers. The sequence may be randomly selected so as to avoid the user's gaze point during the calibration process being biased by a predictable sequence. The array of markers may be a two-dimensional array for a monovision viewer or a three-dimensional array for a stereovision viewer.

Figure 16:
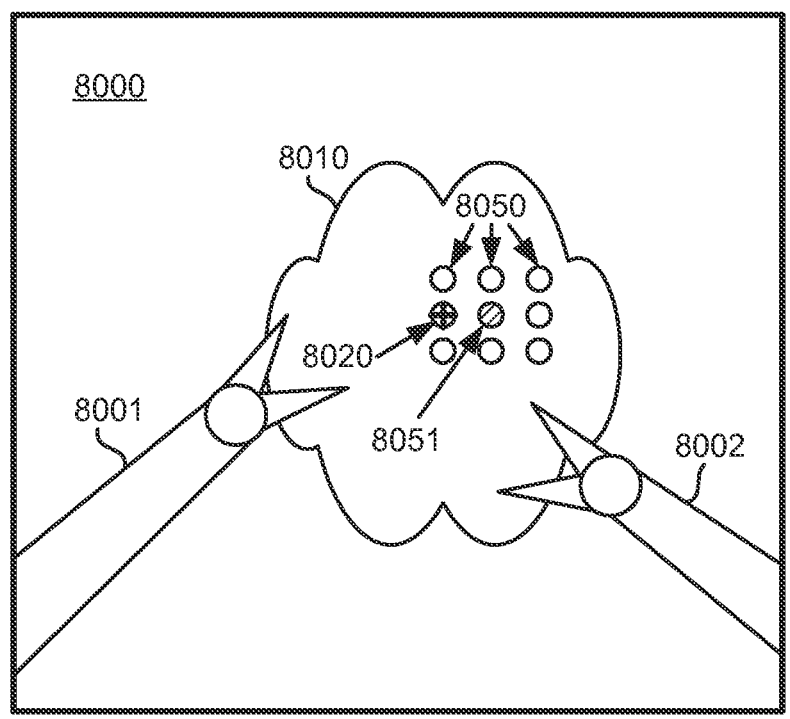
FIG. 16 illustrates a front view of a viewer, as usable in a robotic system utilizing aspects of the present invention, with a marker and determined gaze point displayed for calibration purposes.

In block 7002, the method displays the first marker on the viewer 1020. As an example, FIG. 16 shows a displayed marker 8051 which appears as a hashed circle and the displayable, but not displayed array of markers 8050 which appear as empty circles. At this point, the method may instruct the user to gaze on the displayed first marker 8051 by, for example, issuing a voice instruction to do so through the speaker 1043 or displaying a text message on the viewer 1020.

In block 7003, the method processes information received from eye tracking hardware in the viewer 1020 to track a user's gaze on a display screen of the viewer 1020, as previously explained with respect to the gaze tracker 1041.

In block 7004, the method determines whether the user's gaze point has been fixated on a point or within a specified distance to the point for a threshold period of time. The specified distance and threshold period are preferably determined beforehand empirically to ensure that the user intends to indicate that his/her gaze point is on the displayed marker at the time. Alternatively, the threshold period may be effectively eliminated by the user activating the UI input 1051 or the foot pedal 1052 to indicate that the user intends to indicate that his/her gaze point is on the displayed marker at the time. If the determination in block 7004 is NO, then the method continuously loops through blocks 7003-7004 until a YES determination is made, the user halts the method, or the system halts the method. When block 7004 results in a YES determination, the method proceeds to block 7005.

In block 7005, the method first determines an error between the known position of the displayed marker and the determined user's gaze point on the viewer 1020. It then stores the error as a calibration offset in the memory 1044. As an example, FIG. 16 shows the displayed marker 8051 and the determined gaze point 8020 on the viewer 1020. The determined gaze point 8020 may be indicated to the user by displaying a cross or cursor at the determined gaze point on the viewer 1020. The error in this case appears to be one horizontal marker to the left of the displayed marker 8051. If the gaze tracker was perfectly calibrated to the user's eyes, then the determined gaze point 8020 would be aligned with the displayed marker 8051 on the viewer 1020.

In block 7006, the method determines whether the displayed marker is the last marker to be displayed. If the determination in block 7006 is NO, then in block 7007, the method determines the next marker to be displayed in the sequence of markers and loops back to block 7002 to process the next marker. On the other hand, if determination in block 7006 is YES, then in block 7008, the method ends the calibration process and returns to a processing point where it came from. To provide flexibility to the calibration process, the user may limit the area of calibration by specifying a box in which such action is to be performed or by specifying the spacing between the markers, such as the number of pixels between markers.

Figure 17:
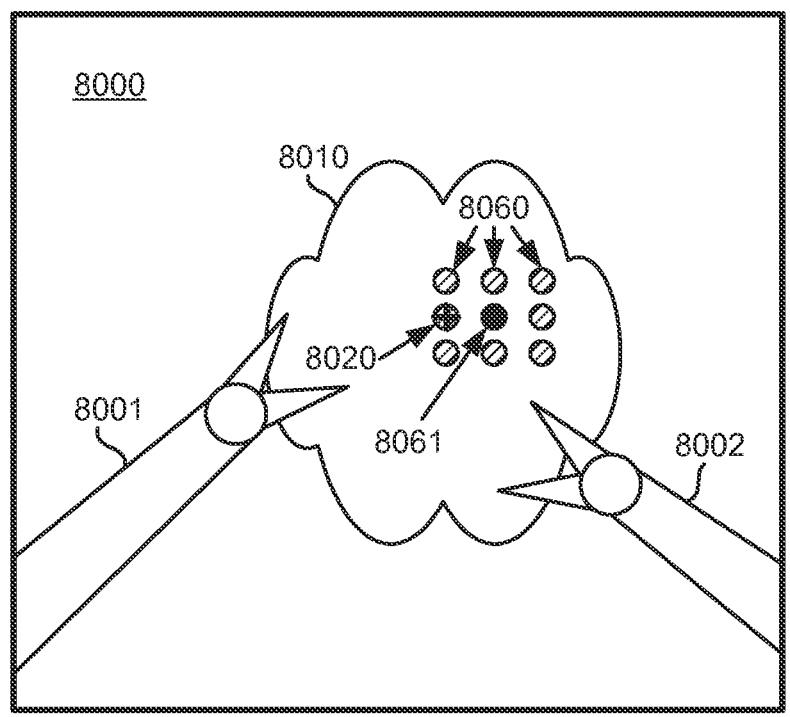
FIG. 17 illustrates a front view of a viewer, as usable in a robotic system utilizing aspects of the present invention, with an array of markers, an actual gaze point, and a determined gaze point depicted for calibration purposes.

An alternative calibration approach to that described in reference to the method of FIG. 11 is now described in reference to FIG. 17. In this approach, all displayable markers 8060 are displayed (as shown by hashed circles) on the viewer 1020. The user gazes on a marker 8061. The gaze tracker 1041, however, determines the gaze point to be at location 8020, which it identifies on the viewer 1020 by the cursor shown in FIG. 17. It is then up to the user to inform the system 1000 that the determined gaze point is off horizontally by one marker to the left, such as in a manner as previously described in reference to block 6005 of FIG. 10. The error is then stored in the memory 1044 as a calibration offset.

Although the various aspects of the present invention have been described with respect to a preferred embodiment, it will be understood that the invention is entitled to full protection within the full scope of the appended claims.

What is claimed is:

1. A medical robotic system comprising:
    a viewer for displaying an image of a work site;
    a gaze tracker for tracking a gaze point of a user on the viewer; and
    a processor configured to:
        draw an area or volume defining shape, overlaid on the image of the work site, in a position determined by the gaze tracker;
        assign a fixed virtual constraint to the shape and constrain movement of a robotic tool according to the fixed virtual constraint;
        receive a user selected action command selecting an image of patient anatomy; and
        superimpose the image of the patient anatomy over the image of the work site within the shape, wherein the image of the patient anatomy is registered to the image of the work site.

2. The medical robotic system of claim 1, wherein the image of the work site is captured by an endoscopic camera.

3. The medical robotic system of claim 1, wherein the image of the patient anatomy is captured preoperatively and retrieved from memory.

4. The medical robotic system of claim 1, wherein the image of the patient anatomy is captured intraoperatively.

5. The medical robotic system of claim 4, wherein the image of the patient anatomy is captured using ultrasound, fluoroscopy, computed tomography, or magnetic resonance imaging.

6. The medical robotic system of claim 1, wherein the user selected action command is identified at least in part based on the tracked gaze point.

7. The medical robotic system of claim 6, wherein the user selected action command is further identified based on receipt of a user input via a user input device.

8. The medical robotic system of claim 1, wherein the user selected action command is identified at least in part based on a voice command.

9. The medical robotic system of claim 1 wherein the image of the patient anatomy is selected from a menu of available images.

10. The medical robotic system of claim 1, wherein the processor is further configured to identify an object closest to the tracked gaze point and determine the object is an anatomical structure in the image of the patient anatomy.

11. The medical robotic system of claim 10, wherein the processor is configured to superimpose the image of the patient anatomy over the image of the work site based on determining the object is the anatomical structure.

12. The medical robotic system of claim 1, wherein the shape has a default size.

13. The medical robotic system of claim 1, wherein a size of the shape is specified by the user.

14. A method of operating a medical robotic system, comprising:
    displaying an image of a work site on a viewer;
    tracking a gaze point of a user on the viewer with a gaze tracker;
    drawing an area or volume defining shape, overlaid on the image of the work site, in a position determined by the gaze tracker;
    assigning a fixed virtual constraint to the shape and constraining movement of a robotic tool according to the fixed virtual constraint;
    receiving a user selected action command selecting an image of patient anatomy; and
    superimposing the image of the patient anatomy over the image of the work site within the shape, wherein the image of the patient anatomy is registered to the image of the work site.

15. The method of claim 14, wherein the image of the work site is captured by an endoscopic camera and the image of the patient anatomy is captured by another imaging modality.

16. The method of claim 14,
    wherein the user selected action command selects the image of the patient anatomy from a menu of available images displayed on the viewer.

17. The method of claim 14, further comprising:
    identifying an object closest to the tracked gaze point; and determining the object is an anatomical structure in the image of the patient anatomy.

\* \* \* \* \*